(12) United States Patent
Volkert et al.

(10) Patent No.: US 11,852,414 B2
(45) Date of Patent: Dec. 26, 2023

(54) DEVICE FOR MAINTAINING A TAP HOLE OF AN ELECTRIC ARC FURNACE

(71) Applicant: Badische Stahl-Engineering GmbH, Kehl (DE)

(72) Inventors: Andreas Volkert, Kehl (DE); Danny Schreiber, Kehl (DE); Sven Fuchs, Willstätt-Legelshurst (DE); Ralf Schweikle, Gutach im Breisgau (DE)

(73) Assignee: BADISCHE STAHL-ENGINEERING GMBH, Kehl (DE)

( * ) Notice: Subject to any disclaimer, the term of this patent is extended or adjusted under 35 U.S.C. 154(b) by 213 days.

(21) Appl. No.: 17/220,574

(22) Filed: Apr. 1, 2021

(65) Prior Publication Data
US 2021/0318069 A1 Oct. 14, 2021

(30) Foreign Application Priority Data

Apr. 8, 2020 (EP) .................................... 20168812

(51) Int. Cl.
*F27D 25/00* (2010.01)
*B25J 13/08* (2006.01)
(Continued)

(52) U.S. Cl.
CPC .......... *F27D 25/008* (2013.01); *B25J 9/1633* (2013.01); *B25J 13/085* (2013.01); *B25J 13/088* (2013.01);
(Continued)

(58) Field of Classification Search
CPC ...... F27D 25/008; F27D 3/1509; F27D 25/00; F27B 3/085; F27B 3/225; B25J 9/1633; B25J 13/085; B25J 13/088
(Continued)

(56) References Cited

U.S. PATENT DOCUMENTS 3,973,761 A * 8/1976 Pelletier .................... C21B 7/12
266/272
4,679,773 A 7/1987 Wunsche
(Continued)

FOREIGN PATENT DOCUMENTS

AT 403774 B 5/1998
CN 1087428 A 6/1994
(Continued)

OTHER PUBLICATIONS

Ralf Schweikle, et al. "Integrated EAF safety concept of BADISCHE-Group"; SMS Siemag AG, Dusseldorf, Germany, May 2017.
(Continued)

*Primary Examiner* — Scott R Kastler
*Assistant Examiner* — Michael Aboagye
(74) *Attorney, Agent, or Firm* — J-TEK LAW PLLC; Jeffrey D. Tekanic; Scott T. Wakeman (57) ABSTRACT

A tap hole cleaning apparatus (20) for an electric arc furnace and a corresponding electric arc furnace (1) enable the cleaning of a tap hole (12) of an electric arc furnace (1) comprising a furnace vessel (2) having an eccentric or offset bottom tap hole (12). A lance head (24) is movable in a first step from a lower end position to an upper end position into and through the tap hole (12), and in a second step, the lance head (24) is movable back through the tap hole (12) from the upper end position to the lower end position while ejecting oxygen through one or more lateral oxygen ejection nozzles to clean the inner periphery of the tap hole (12).

22 Claims, 9 Drawing Sheets

(51) Int. Cl.
*F27D 3/15* (2006.01)
*B25J 9/16* (2006.01)
*F27B 3/22* (2006.01)
*F27B 3/08* (2006.01)
*B25J 19/00* (2006.01)

(52) U.S. Cl.
CPC .............. *F27B 3/085* (2013.01); *F27B 3/225* (2013.01); *F27D 3/1509* (2013.01); *B25J 19/0054* (2013.01)

(58) Field of Classification Search
USPC .................................................. 266/45, 135
See application file for complete search history.

(56) References Cited

U.S. PATENT DOCUMENTS

| | | | |
|---|---|---|---|
| 4,747,582 | A | 5/1988 | Bergstroem et al. |
| 4,875,663 | A * | 10/1989 | Forestier ............... F27D 3/1509 266/287 |
| 5,153,894 | A | 10/1992 | Ehle et al. |
| 6,110,415 | A * | 8/2000 | Hickman ............... C21C 5/4653 266/271 |
| 6,185,242 | B1 | 2/2001 | Arthur et al. |
| 8,700,197 | B2 | 4/2014 | Plociennik et al. |
| 9,500,412 | B2 * | 11/2016 | Monti .................... F27B 3/085 |
| 9,759,490 | B2 * | 9/2017 | Calvi ...................... C21B 7/12 |
| 2011/0295399 | A1 | 12/2011 | Plociennik et al. |
| 2016/0153714 | A1 | 6/2016 | Dorndorf et al. |
| 2018/0195141 | A1 | 7/2018 | Al-Harbi |

FOREIGN PATENT DOCUMENTS

| | | | | |
|---|---|---|---|---|
| CN | 2415328 | Y | 1/2001 | |
| CN | 105518401 | A | 4/2016 | |
| CN | 106498122 | A | 3/2017 | |
| CN | 108027205 | A | 5/2018 | |
| CN | 108034789 | A | 5/2018 | |
| CN | 110923394 | A | 3/2020 | |
| DE | 8530922 | U1 | 12/1985 | |
| DE | 4034809 | A1 | 5/1992 | |
| DE | 102009051145 | A1 | 5/2010 | |
| EP | 0385434 | A2 | 9/1990 | |
| EP | 0385434 | B1 | 5/1993 | |
| EP | 2482019 | A1 | 8/2012 | |
| EP | 2482019 | B1 | 10/2014 | |
| JP | H10219329 | * | 8/1998 | .......... F27D 25/008 |
| JP | H10219329 | A | 8/1998 | |
| JP | 2001215084 | A | 8/2001 | |
| KR | 20130134880 | A | 12/2013 | |
| WO | 8602437 | A1 | 4/1986 | |
| WO | 2009153026 | A1 | 12/2009 | |

OTHER PUBLICATIONS

Success in Electric Steelmaking Arccess EAF Technik, SMS Siemag AG, Dusseldorf, Germany, Mar. 2009.
Office Action from the Chinese Patent Office dated Apr. 7, 2022 in related Chinese application No. 202110367068.3, and translation thereof.
Search Report from the Chinese Patent Office dated Mar. 31, 2022 in related Chinese application No. 202110367068.3, and translation thereof.

* cited by examiner

DEVICE FOR MAINTAINING A TAP HOLE OF AN ELECTRIC ARC FURNACE

CROSS-REFERENCE

The present application claims priority to European patent application serial number 20 168 812.4 filed on 8 Apr. 2020, the contents of which are incorporated fully herein by reference.

TECHNICAL FIELD

The present invention generally relates to a device for maintaining (cleaning) the tap hole of an electric arc furnace.

BACKGROUND ART

Electric arc furnaces are known, for example, from EP 0 385 434 A2 (U.S. Pat. No. 5,153,894) or DE 85 30 922 U1. A tap hole is designated by reference sign 21 in EP 0 385 434 A2, for example, in FIGS. 3 and 8, and by reference sign 3 in FIG. 1 of DE 85 30 922 U1.

Electric arc furnaces (EAF) are available in various designs in terms of the design of the tap/tapping. Tap/Tapping refers, when discussed as an action, to the process of draining or pouring liquid steel from the melting vessel during steelmaking, and refers, when discussed as a device, to the corresponding design of the metallurgical melting vessel.

EAFs can have a tap in the form of a tapping spout or in the form of a tap hole or a combination thereof such as a submerged tap hole. There are different types of EAFs with tapping holes, such as EAFs with centric bottom tapping (CBT), EAFs with offset bottom tapping (OBT), or EAFs with eccentric bottom tapping (EBT). In an EAF with OBT, the furnace bottom vessel is circular and the tap hole is offset from the center. In the case of an EAF with EBT, the furnace bottom vessel comprises a bay in which the tap hole is arranged.

The various designs differ, for example, in the way they can be operated. Depending on the design, operation with or without sump (the term "sump" means liquid molten mass remaining in the vessel after tapping) is possible. There are differences in the tilt angles required for tapping and the resulting design, differences in the cable lengths required for the power supply and therefore in the reactance, differences in the possibility of reducing the entrainment of slag, etc.

With regard to the tap hole, there are various requirements and problems, some of which also differ depending on the design.

Steel or slag deposits (skull formation) may occur in the tap hole or at its entrance (inlet). Fragments of the electrodes or fragments of the refractory lining of the furnace vessel may become lodged, jammed, caked, or the like, in the tap hole or at its entrance. Both lead to potential blockages or at least severe diameter changes of the tap hole, which must be eliminated.

In prior art techniques, this is done, for example, by burning free the blockage and/or deposits in the tap hole with the aid of an oxygen lance which is inserted into the furnace vessel of the EAF through a lateral opening. In DE 40 34 809 A1, a so-called lance robot is shown which can be moved on the floor (mainland) to a lateral opening of the tilting furnace vessel of an EAF and automatically or semi-automatically moves a lance from above to the tap hole or other parts of the furnace. A similar device is known from WO 86/02437 A1, in which a manipulator with lance is mounted on the floor (mainland) and can be inserted into the furnace vessel through a side furnace door. From DE 10 2009 051 145 A1 (US 2011/0295399), it is known to attach such a lance to an industrial robot mounted directly or indirectly on the floor (mainland) and to move it by means of the robot and to use it for burning open the tap hole of an EAF.

It is known from AT 403 774 B and EP 2 482 019 A1 that such a lance can be used to burn open the outlet opening of a casting ladle. In EP 2 482 019 A1, the lance is attached to an industrial robot and moved by the robot.

U.S. Pat. No. 4,875,663 discloses a tap hole cleaning device in which a nozzle is pivoted at an arm under a tap hole and is moved along the longitudinal axis of the hole from below to the tap hole. Deposits located at the outlet of the hole can be removed by oxygen or a mixture of oxygen and burner gas. U.S. Pat. No. 4,679,773 discloses an EAF with a tap hole having a horizontal longitudinal axis. JPH10-219329 (A) discloses a lance for pretreatment of iron and for removing metal deposited on the wall in a converter, which is inserted from above through the opening of the converter and comprises nozzles directed to the front having an inner diameter of e.g. 20 to 26 mm at its tip and comprises lateral sub-nozzles directed obliquely backwards.

SUMMARY OF THE INVENTION

The present disclosure is mainly concerned with a device for maintaining (e.g., cleaning) the tap hole of a furnace vessel of an electric arc furnace (EAF) with eccentric bottom tapping (EBT) or with offset bottom tapping (OBT), in particular with the clearing and/or the burning free (e.g., ablation) of the same. An EAF with EBT or OBT advantageously allows a design with low tilt angles)(<18° necessary for tapping.

It is therefore one non-limiting object of the present teaching to disclose techniques for improving the maintenance of the tap hole of a furnace vessel of an electric arc furnace without affecting the design advantages of the furnace.

In one non-limiting aspect of the present teachings, a tap hole maintenance device is provided for maintaining and/or cleaning (e.g., clearing and/or removing deposits from) a bottom tap hole of an electric arc furnace. The electric arc furnace preferably comprises a furnace vessel having a furnace lower vessel with an eccentric or offset bottom tap hole having a minimum diameter along a first longitudinal axis (L1) thereof, and a furnace tilting device comprising a cradle, on which the furnace vessel is supported, configured to tilt the furnace vessel relative to a horizontal of a foundation, on which the electric arc furnace is supported.

The tap hole maintenance device preferably comprises a pivot arm configured to be pivoted between a parking position and a maintenance position, and a lance attached to or at an end portion of the pivot arm and extending along a second longitudinal axis (L2).

The lance preferably comprises a lance head that is movable along the second longitudinal axis (L2) of the lance from a lower end position to an upper end position and vice versa. The lance head has an outer diameter which is smaller than the minimum diameter of the bottom tap hole. In addition, the lance head comprises one or more lateral oxygen outlet nozzles having an outlet angle that extends oblique downwards with respect to the second longitudinal axis (L2) of the lance. Furthermore, the lance is configured to be attached to (or is attached to) the furnace vessel and/or to the cradle such that the lance is movable together with the furnace vessel when the furnace vessel is tilted. In the maintenance position of the pivot arm (but not in the parking position of the pivot arm), the lance is located under the tap hole with the second longitudinal axis (L2) of the lance being coaxial with the first longitudinal axis (L1) of the bottom tap hole. Thus, in the maintenance position of the pivot arm, the lance head is movable into and through the tap hole when the lance head moves from its lower end position to its upper end position.

With such a tap hole maintenance device and an electric arc furnace that includes such a tap hole maintenance device, it becomes possible to easily and effectively clear and clean the bottom tap hole of the furnace vessel of foreign matter directly after tilting back the furnace (i.e. after a tapping was performed) by moving the lance head through the tap hole from below and then moving the lance head back.

Owing to this design, it is possible, on the one hand, to maintain the smallest tilt angles possible and, on the other hand, to clean the tap hole from below through the tap hole.

This design further enables an automated cleaning of the tap hole from below through the tap hole. It is advantageous for this purpose to (a) cool the pivot arm with water to reduce length changes and other heat-related deformations that might affect the positional accuracy of moving the lance head relative to the tap hole, and/or (b) record the moving paths and thus the positional accuracy of the moving/movement of the lance head, and/or (c) detect the force exerted by the lance head to prevent damage to the tap hole and/or the refractory lining of the furnace vessel.

Further objects, features, advantages and functionalities (utilities) will become apparent to a person of ordinary skill in the art upon reading the following description of the embodiments and appended claims with reference to the figures.

BRIEF DESCRIPTION OF THE DRAWINGS

FIGS. 3A-3C show the first embodiment of the electric arc furnace with EBT in the tilted back position with the tap hole maintenance device having the pivot arm in a maintenance position and a lance head in a lower end position, wherein

FIGS. 5A-5C shows the first embodiment of the electric arc furnace with EBT in the tilted back position with the tap hole maintenance device having the pivot arm in the maintenance position and the lance head in a position after moving into and through the tap hole, wherein

FIGS. 8A and 8B show a first embodiment of a lance head in a perspective view, wherein

FIGS. 9A and 9B show a second embodiment of a lance head in a perspective view, wherein

FIGS. 10A and 10B show a third embodiment of a lance head in a perspective view, wherein

DETAILED DESCRIPTION OF THE EMBODIMENTS OF THE INVENTION

Figure 1:
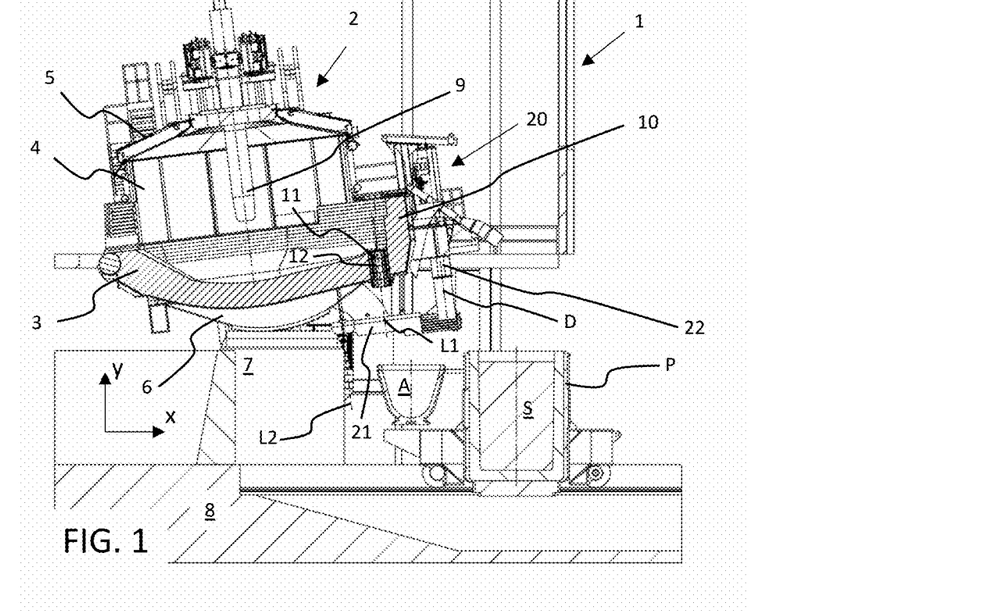
FIG. 1 shows a cross-sectional view of a first embodiment of an electric arc furnace with EBT in a tilted back position with a tap hole maintenance device having a pivot arm in a parking position.

FIG. 1 shows a cross-sectional view of a first embodiment of an electric arc furnace (EAF) 1 with an eccentric bottom tapping (EBT) 11 on the right side in FIG. 1. The EAF comprises a furnace vessel 2 having a furnace lower vessel 3, a furnace upper vessel 4 and a furnace lid 5. The furnace vessel 2 is tiltably mounted on a foundation 7 via a furnace tilting device having a furnace cradle 6 and a hydraulic cylinder that is not shown. The foundation 7 is located on a floor 8, which is also referred to as the mainland. FIG. 1 shows a coordinate system x-y. The direction x points in the horizontal direction from the rear to the front of the EAF and the direction y points in the direction perpendicular to an upper surface of the ground (floor 8, mainland) from the bottom to the top. A direction z (which is not shown by an arrow) is directed perpendicular to directions x and y and away from the paper plane. The furnace vessel 2 is shown in a position tilted back (rearward in the x direction) from a horizontal position. The furnace vessel is tilted into such a tilted-back position as quickly as possible at the end of a tapping process in order to prevent, as much as possible, slag from being dragged with the molten mass during tapping. The EAF shown is an EAF operated with alternating current and comprises three electrodes 9 (only one shown) of an electrode assembly. The electrodes 9 project through the furnace lid 5 into the furnace vessel 2 during operation and are used to generate heat energy to melt solid steel such as metal scrap disposed in the furnace vessel 2.

In an EAF with EBT, the furnace lower vessel 3 comprises a bay 10. Such a bay 10 is a part of the furnace lower vessel 3 and projects forward in the x-direction beyond the circumference of the furnace upper vessel 4. The eccentric bottom tapping (EBT) 11 is arranged in the bay. The furnace lower vessel 3 comprises an outer shell lined with refractory material (lining). The EBT 11 comprises a tap hole 12 which extends linearly along a (first) longitudinal axis L1 (of the tap hole 12) through the furnace lower vessel 3, i.e. through the outer shell and the lining. The tap hole 12 is closed (sealed) during melting and before tapping by a slide (not shown) at the bottom of the furnace lower vessel 3 and is filled with a refractory filling material.

The tap hole 12 has a predetermined initial inner diameter, e.g. 140 mm or 180 mm, which is constant along the longitudinal axis L1, at the beginning of a furnace cycle, i.e. the period of usability of a lining before it has to be renewed (replaced or cleaned, as will be described below). The diameter and shape of the inner periphery of the tap hole 12 change during the use of the EAF due to the highly abrasive action of the liquid steel and, if applicable, the slag, to become more like a funnel shape (instead of the original circular cylindrical shape of the inner periphery of the refractory lining) and the inner diameter of the tap hole 12 becomes larger. Therefore, the refractory lining of the tap hole 12 usually needs to be replaced more frequently than the rest of the refractory lining of the furnace 1. This is usually done by replacing the so-called tapping block, i.e. the part of the refractory lining forming the tap hole 12. This block is shown in FIG. 1 (and in FIG. 2) by different hatching as a component different from the rest of the lining.

After tapping, i.e. after pouring the molten steel through the tap hole, which is done by gradually tilting the furnace vessel forward and then rapidly tilting it back to the opposite tilted position, in prior art techniques, the tap hole was cleaned from above by using an oxygen lance which was guided and moved through a hole in the furnace wall or the like. This cleaning was required because the tap hole is filled with a refractory sand before the next melting process. For this purpose, it must be cleaned, e.g., to remove adhering steel or slag residues or the like.

For this purpose, the EAF 1 comprises a tap hole maintenance device 20 having a pivot arm 21 that is attached to a column 22 and located in a parking position in FIG. 1. The tap hole maintenance device 20 is described further below.

Figure 2:
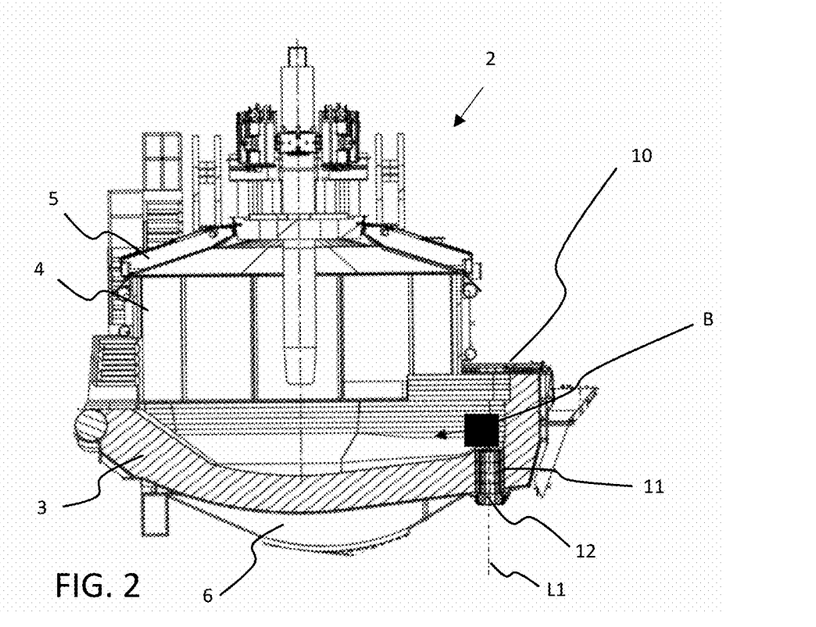
FIG. 2 shows an electric arc furnace with EBT in a horizontal position in a cross-sectional view to illustrate a tap hole blockage problem.

In FIG. 2, an electric arc furnace with EBT is shown in a horizontal position in a cross-sectional view to illustrate a problem of blockage of the tap hole 12. As was described in the background section above, steel or slag deposits (skull formation) may occur (form) in the tap hole or at its entrance (inlet). In addition, fragments of the electrodes or fragments of the refractory lining of the furnace vessel 3 may become lodged, jammed, caked, or the like in the tap hole or at its entrance. Both lead to potential blockages or at least severe diameter changes (reductions) of the tap hole 12, which have to be removed. In FIG. 2, an object B blocking the upper opening of the tap hole 12 is schematically shown. This object B could be such a fragment of the electrodes or refractory lining. It must be moved away from the opening of the tap hole 12, as indicated by the arrow.

For this purpose, the tap hole maintenance device 20 is provided, and the design, arrangement and method of operation of the tap hole maintenance device 20 are described below. In all figures, the same reference signs are used for the same or corresponding features, except where specifically described otherwise, and the description thereof is not repeated.

Figure 7:
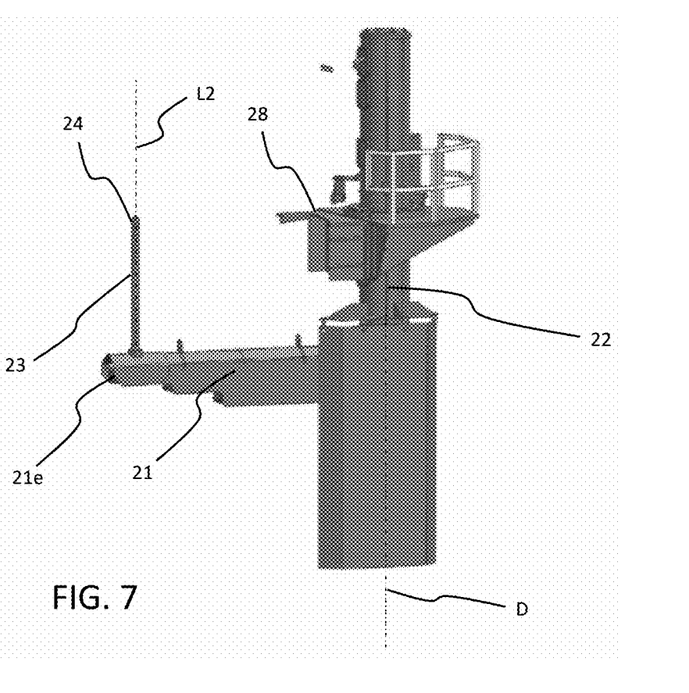
FIG. 7 shows a perspective view of a first embodiment of the tap hole maintenance device.

As shown in FIGS. 1 and 7, the tap hole maintenance device 20 includes the pivot arm 21, which is attached to the column 22 and is in a parked position in FIG. 1. The column 21 is a column that is rotatably supported about an axis of rotation D, and is movable up and down along its axis of rotation D. The column 21 comprises a flange 28 for attachment to the furnace vessel 2 and/or to the cradle 6 of the EAF. The column 22 is configured such that its axis of rotation D is adjustable parallel to the longitudinal axis L1 of the tap hole 12. The pivot arm 21 is formed as an extension arm of the column 22. As a result, by rotating the column 22 about its axis of rotation D, the pivot arm 21 can be pivoted about the axis of rotation D of the same. The pivot arm 21 is pivotable between the parking position shown in FIG. 1 and a maintenance position shown in FIGS. 3A-3C. The pivot arm 21 is water-cooled, e.g., by providing water pipes (not shown) inside the pivot arm 21 and an exterior water pump (not shown) that circulates cooling water through the water pipes. The water cooling prevents excessive length changes of the pivot arm 21.

A lance 23 is attached to (at) an end portion 21e of the pivot arm 21. The lance 23 extends along a (second) longitudinal axis L2. The exact position of the lance 23 at the end section 21e is adjustable along the pivot arm 21 and thus in radial direction from the axis of rotation D. The lance 23 is attached to the end section 21e such that the longitudinal axis L2 of the lance 23 extends parallel to the axis of rotation D of the column 22. Because the axis of rotation D is adjustable parallel to the longitudinal axis L1 of the tap hole 12, the longitudinal axes L1 and L2 and the axis of rotation D extend parallel to each other in the correctly adjusted state.

Figure 3A:
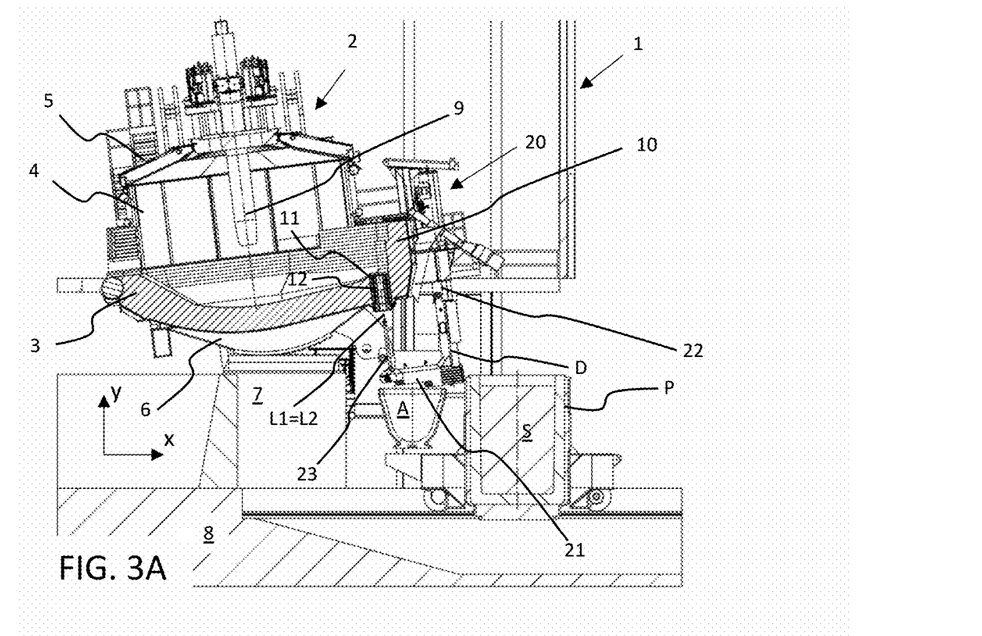
FIG. 3A shows a cross-sectional view thereof.
Figure 3B:
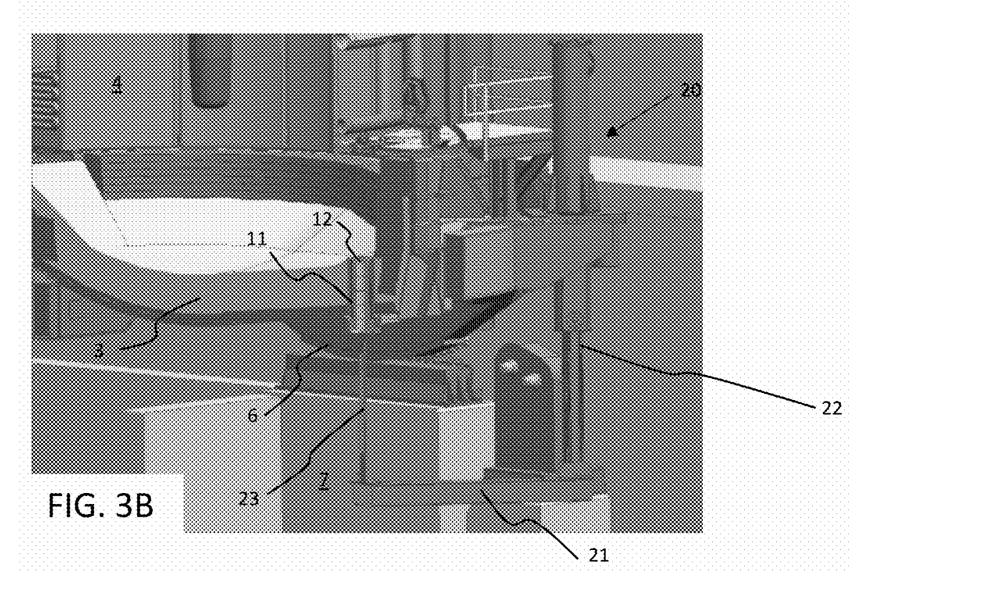
FIG. 3B shows a cross-sectional perspective view from obliquely in front thereof.
Figure 3C:
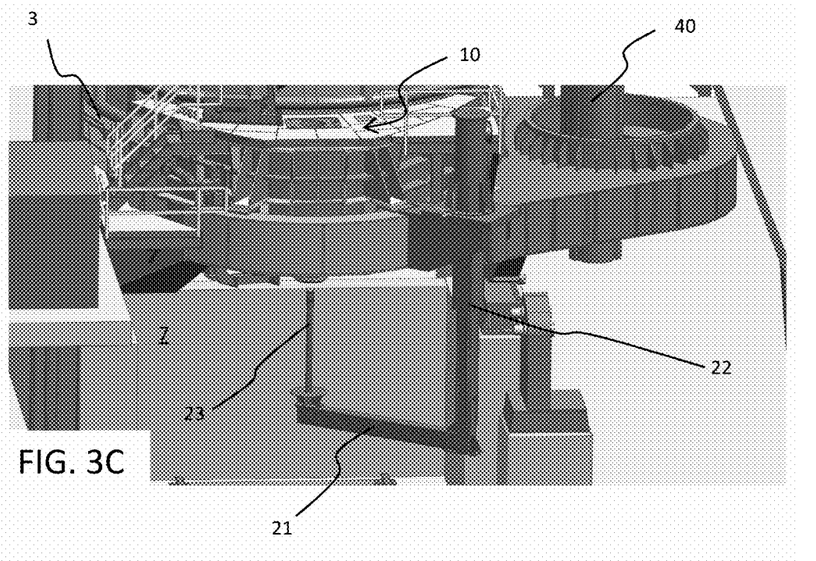
FIG. 3C shows a cross-sectional perspective view from the front thereof.

The maintenance position shown in FIGS. 3A-3C is selected so that in this pivot position of the pivot arm 21, if the radial distance of the lance 23 from the axis of rotation D is set correctly (distance D to L1 equals distance D to L2), the longitudinal axes L1 and L2 are coaxial, i.e. they coincide.

The pivot arm 21 (and thus the lance 23 attached to it) can be moved up and down along the axis of rotation D together with the column 22 by moving the column 22 up and down along the axis of rotation D. For moving the column 22 along the axis of rotation D, a double-acting hydraulic cylinder is provided. A drive having an electric motor is provided for pivoting the pivot arm 21 about the axis of rotation D. Of course, other types of drives could also be used, such as an electric drive for the up and down movement, but the above-described design is currently preferred.

The tap hole maintenance device 20 comprises transducers (sensors) which are used to record the distances covered during the pivoting movement of the pivot arm 21 and the up and down movement of the column 22 and thus the tip of the lance 23, and the data are output to a control system, which is not shown. The control system may comprise a processor, memory with executable programs stored therein, I/O ports, etc., as will be described further below. A position detection at the end positions is used for correction value detection.

The lance 23 comprises a lance head 24. The lance head 24 has an outer diameter that is smaller than the nominal diameter (initial diameter=minimum diameter) of the bottom tap hole 12. The lance head 24 comprises one or more lateral oxygen discharge nozzles 31, 32, 33 (see FIGS. 8A-8B, 9A-9B, and 10A-10B) that extend(s) at a downward discharge angle oblique to the longitudinal axis L2 of the lance 23. The lance head 24 and its design are described in more detail below.

In the maintenance position shown in FIGS. 3A-3C, the lance 23 and thus the lance head 24 can thus be moved into and entirely through the tap hole 12 between a lower end position of the lance head 24 and an upper end position of the lance head 24 where the lance head 24 is above, preferably at least 300 millimeters above, an upper end of the tap hole 12 by moving the column 22 up and down along the axis of rotation D coaxially with the longitudinal axis L1 of the tap hole 12.

Alternatively, other ways of moving the lance head 24 into and through the tap hole 12, e.g., by designing the lance as a hydraulically or electrically driven telescope, etc., are possible, but the above-described embodiment is currently preferred.

In a specific (concrete) embodiment of the present teachings, the tap hole maintenance device 20 may comprise the column 22, which is equipped with a rotatably supported steel structure having internal guide profiles of a three-dimensionally adjustable welding console, a movable inner column, internal guide rollers, a double-acting hydraulic cylinder with integrated displacement measuring system for realizing (executing) the stroke movement (e.g. 2 meters), pressure detection and possible locking of the cylinder, an internal oxygen line, an electric drive for the rotary movement with integrated absolute encoder, an end position monitoring system in (at) the end position (for calibration), mechanical end stops for limiting the rotary movement, protective plates to protect against buildup, media and cable routing suitable for the smelting work environment, oxygen and cooling water supply by means of freely suspended hoses to the mainland, a PLC control system in a switch cabinet, two operating terminals and a cable-connected remote control, a hydraulic valve cabinet, and maintenance openings for inspection, a water-cooled boom serving as the pivot arm 21, consisting of a tubular construction, and an oxygen-flow lance 23, which can be adjusted radially relative to the pivot point, with a nozzle head for ejecting (expelling, discharging) the oxygen.

In FIGS. 3A-3C, the same EAF as in FIG. 1 is shown in the tilted back position, in which the tap hole maintenance device 20 is shown with the pivot arm 21 in the maintenance position and the lance head 24 in (at) its lower end position. Specifically, FIG. 3A shows a cross-sectional view thereof, FIG. 3B shows a cross-sectional perspective oblique front view thereof, and FIG. 3C shows a cross-sectional perspective front view thereof.

As can be seen clearly in FIG. 3A-3C, the lance 23 is aligned coaxially with the longitudinal axis L1 of the tap hole 12 in the maintenance position shown. In addition, the column 22 has been moved downward along the axis of rotation D with respect to the parking position, so that the pivot arm 21 and thus the lance head 24 are in (at) their lower end position.

As can be readily seen in FIG. 3C in conjunction with FIG. 7, the tap hole maintenance device 20 is attached to the platform of the cradle 6 laterally (in the z-direction) in front of the bay 10 via the flange 28 (shown in FIG. 7).

On the same side, a gantry 40 is provided laterally adjacent to (behind in the z-direction) the furnace vessel 2, of which the furnace lower vessel 3 with the bay 10 is partially shown. The gantry 40 functions in a known manner to hold and lift the electrode(s) 9 and to lift the lid 5. As can be seen by comparing FIGS. 1, 3A and 3C, the pivot arm 21 is pivoted in the parking position with respect to the maintenance position in the direction of one side of the furnace, here the side of the gantry 40, and is moved upward. As a result, the pivot arm 21 and the lance 23 are out of the way when a ladle car carrying a ladle P is moved under the EBT 11 for tapping. Obviously, parking sideways in this manner also eliminates any need to change the tilt angle. In FIGS. 1 and 3A, the furnace 1 is shown directly (immediately) after a tapping operation and the ladle P is filled with liquid steel S. At the front of the ladle car is a waste container A, which is positioned under the tap hole 12 and catches any objects that may fall out of the tap hole 12 during cleaning.

For cleaning, the lance head 24 is first moved upwards from below into and through the tap hole 12 without ejecting oxygen, and foreign bodies are thereby moved out of the tap hole 12 or pushed away from its upper opening. This is done automatically with an evaluation of the detected movement data by the control system. Afterwards, the lance head 24 is moved back down through the tap hole 12 from above with the ejection of oxygen, and the inner periphery of the tap hole 12 is burned (ablated) to become free (cleared), i.e. freed from deposits, in this process.

The force exerted by the lance head 24 during the movement is detected, for example, by sensing the pressure of the hydraulic cylinder or a force measurement sensor, etc. The automated movement of the lance head 24 between the lower end position and the upper end position is performed (e.g., controlled by the control system) such that when a limit value for the force exerted by the lance head 24 is reached, the automated movement of the lance head is stopped. For example, the control system may execute an algorithm in which (i) the pressure during movement of the lance head 24 is monitored (e.g., sampled at regular intervals, such as multiple times per second), (ii) the detected pressure is converted to a digital value, (iii) the digital value is compared to a stored upper pressure limit, (iv) in response to a determination that the digital value is less than the stored upper pressure limit, movement of the lance head 24 is continued, and (v) in response to a determination that the digital value is equal to or greater than the stored upper pressure limit, movement of the lance head 24 is stopped by the control system. The limit value (stored upper pressure limit) is, e.g., between 400 N and 1000 N, preferably between 400 N and 800 N, for example 500 N or 600 N or 700 N. The limit value is chosen so that in case of accidental contact of the lance head 24 with the refractory lining, stoppage of the lance head 24 prevents the refractory lining from being severely damaged. If the limit value is exceeded, the automated procedure is stopped and the lance head 24 is moved back to the lower end position. The reason for the high force must be investigated by an operator, e.g. by observation, and eliminated if necessary, before either the automated movement can be restarted or manual control is performed.

Figure 4:
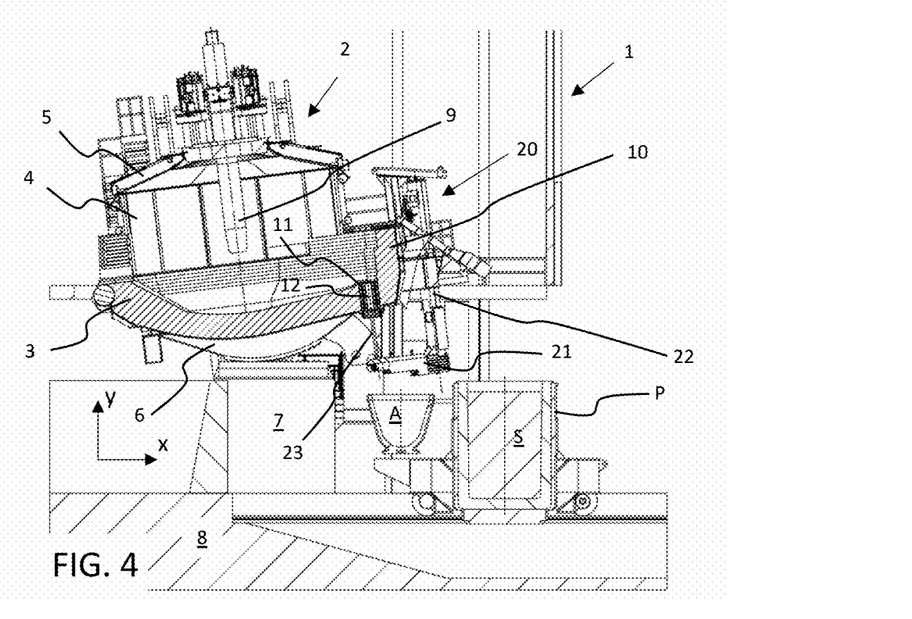
FIG. 4 shows a cross-sectional view of the first embodiment of the electric arc furnace with EBT in the tilted back position with the tap hole maintenance device having the pivot arm in the maintenance position and the lance head in a position retracted away from the tap hole.

In FIG. 4, the movement of the lance 23 with the lance head 24 upward is shown. The lance head 24 is located in the lower end section of the tap hole 12.

Figure 5A:
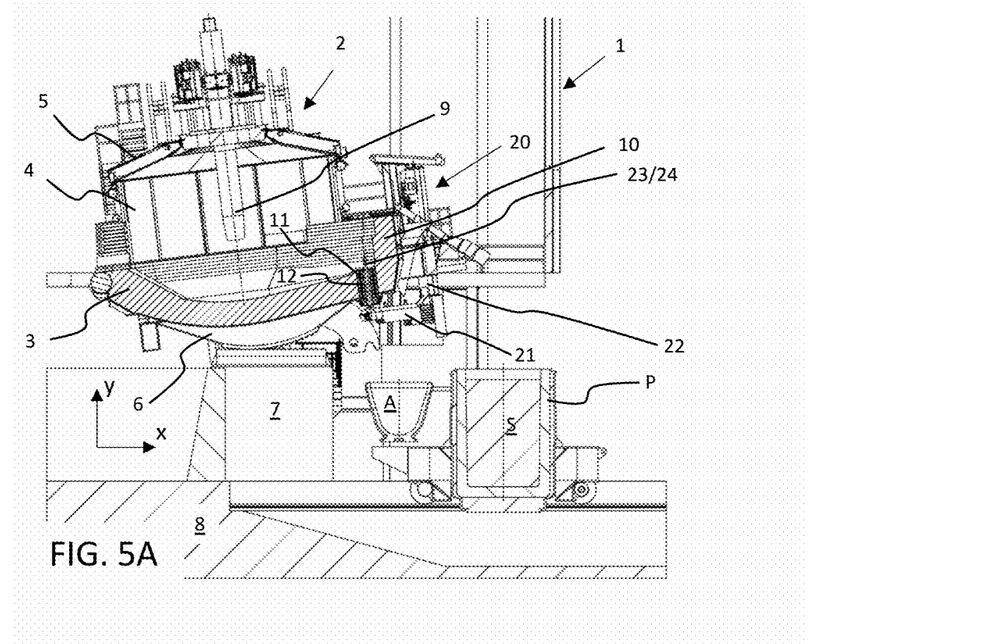
FIG. 5A shows a cross-sectional view thereof.
Figure 5B:
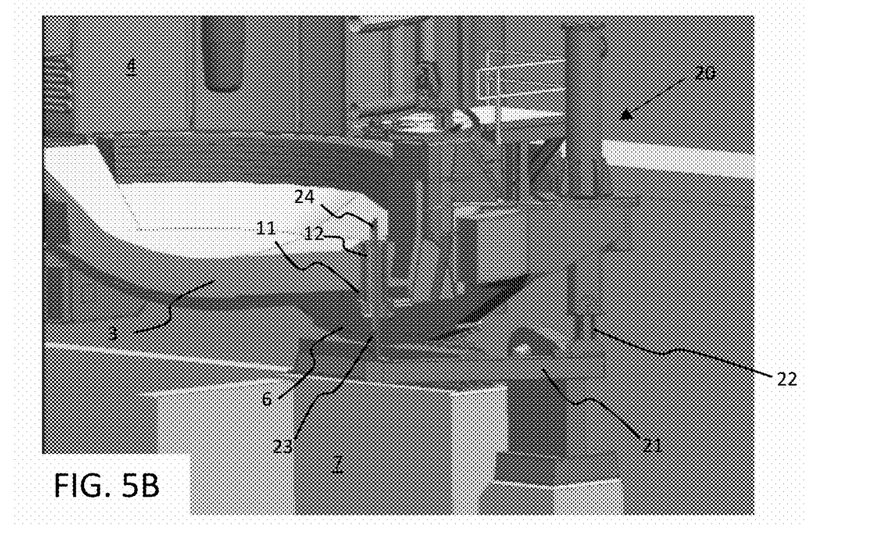
FIG. 5B shows a cross-sectional perspective oblique front view thereof.
Figure 5C:
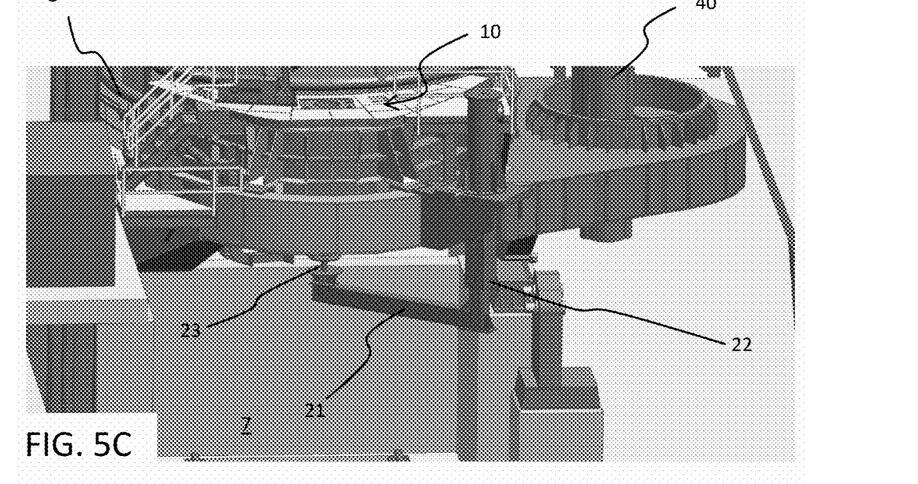
FIG. 5C shows a cross-sectional perspective front view thereof.

In FIGS. 5A-5C, views comparable to FIGS. 3A-3C are shown. In the position shown in FIGS. 5A-5C, the pivot arm 21 is in the maintenance position and the column 22, and thus the lance 23, have moved up so far that the lance head 24 is located above the upper opening of the tap hole 12, as can be seen in FIG. 5B.

Figure 6:
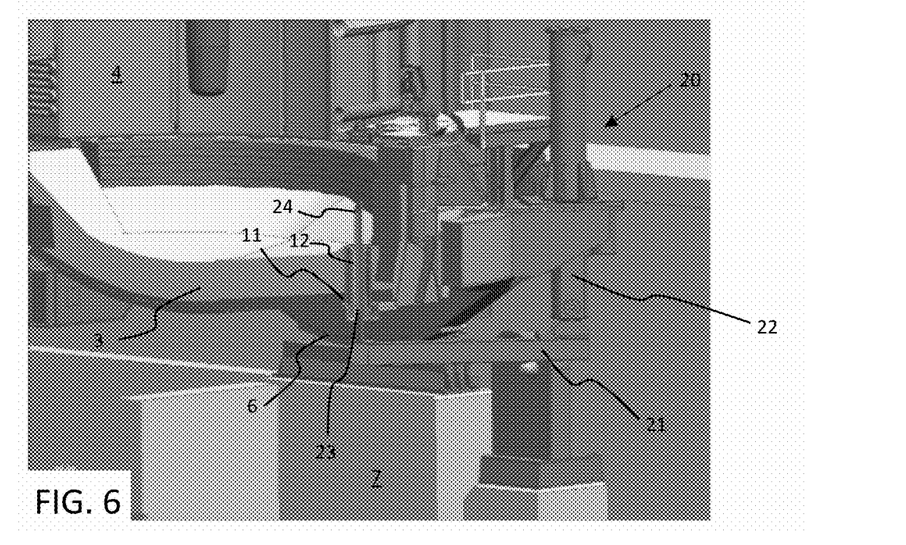
FIG. 6 shows a cross-sectional perspective oblique front view of the first embodiment of the electric arc furnace with EBT in the tilted back position with the tap hole maintenance device having the pivot arm in the maintenance position and the lance head at an upper end position.

FIG. 6 shows a view comparable to FIGS. 3B and 5B. The lance head 24 is at its upper end position. The length of the lance 23 and the length of the movement paths are preferably selected so that the upper end of the lance tip 24 projects at least 300 mm above the tap hole 12. That means, the length of the lance 23 up to the tip of the lance head 24 is preferably at least the length of the structure of the furnace 1 around the tap hole 12 in its longitudinal direction (=height) with refractory lining, furnace vessel shell, attachments such as slide device, etc., plus 300 mm, so that the lance head 24 can extend (project) upwards out of the tap hole by up to 300 mm.

This upward stroke movement is intended to remove smaller interfering bodies lying in or on the tap hole 12. Larger interfering bodies or strongly jammed interfering bodies will trigger the force limit shut-off.

As it moves back (downward), the tap hole 12 is then cleared of attachments (deposits) with the aid of oxygen. To do this, the lance head 24 is moved through the positions shown in reverse order, i.e. in the sequence of FIGS. 5A-5C, 4, 3A-3C.

Three positions are provided for the pivot arm 21. The above-described tap hole maintenance position is under the tap hole. The above-described parking position is between the ladle and the foundation (gantry side). This parking position must allow or not hinder the tilting of the furnace.

In addition, there is also a third, device maintenance position, which has not been described thus far, in (at) which e.g. a change (modification, replacement, etc.) of the lance takes place. In this device maintenance position, it is also possible to equip the lance with a tap hole block. Then, a partially automated exchange of the tap hole block is also possible, but only in a horizontal position of the EAF that is locked against tilting.

Figure 8A:
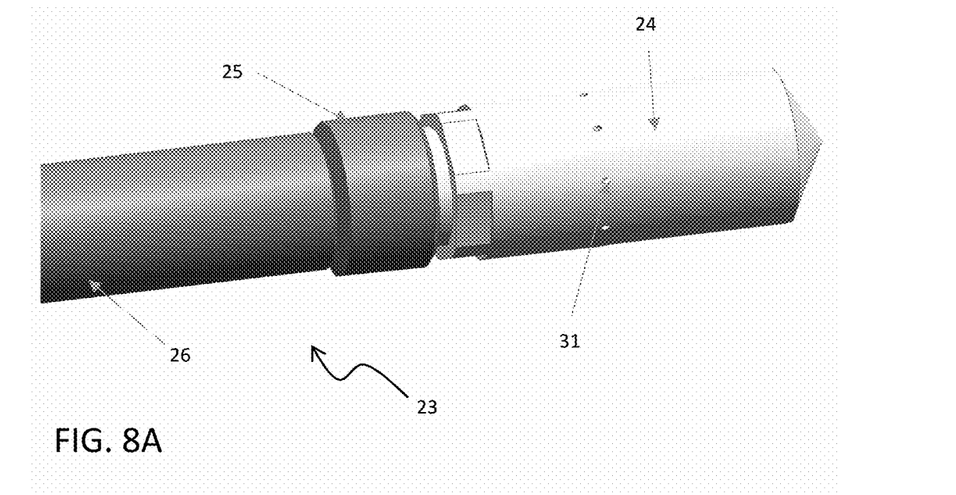
FIG. 8A shows an external view and FIG. 8B shows a cut-away view.
Figure 8B:
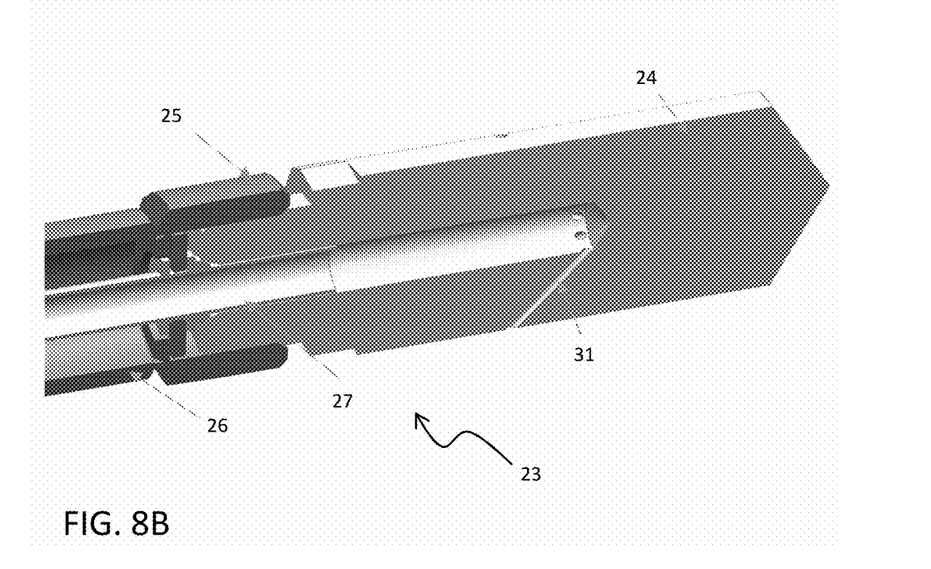

Three alternate designs of the lance head 24 will be described below. In FIGS. 8A-8B, a first embodiment of a lance head 24 is shown in a perspective view, in in which FIG. 8A shows an external view and FIG. 8B shows a cut-away view. The lance head 24 is attached to the end of a tube 26 of the lance 23 via a threaded connection 25. An oxygen conduit (line) 27 is guided in (defined by) the tube 26 and terminates in (at) a central blind hole of the lance head 24. From the front end of the central blind hole of the lance head 24, circumferentially distributed bores 31 extend radially outwardly and rearwardly (toward the pivot arm) at an angle of 45° to the longitudinal axis L2. The holes 31 form nozzles for ejecting (expelling, discharging) oxygen supplied under pressure through the conduit 27. For a tap hole 12 having a predetermined initial diameter of 180 mm, the lance head 24 preferably has an outer diameter that is 40 mm to 60 mm smaller, for example 130 mm, so that there is 20 mm to 30 mm clearance around the entire circumference, in the example preferably a 25 mm clearance, when optimally adjusted.

Figure 9A:
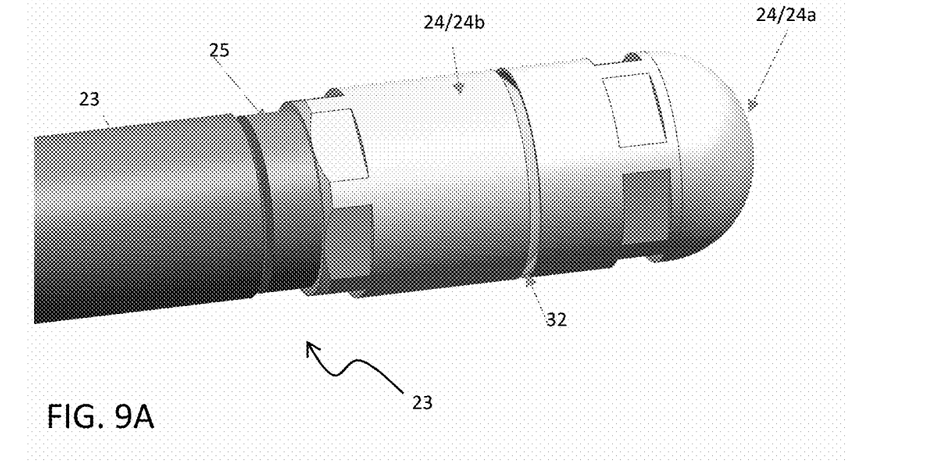
FIG. 9A shows an external view and FIG. 9B shows a cut-away view.
Figure 9B:
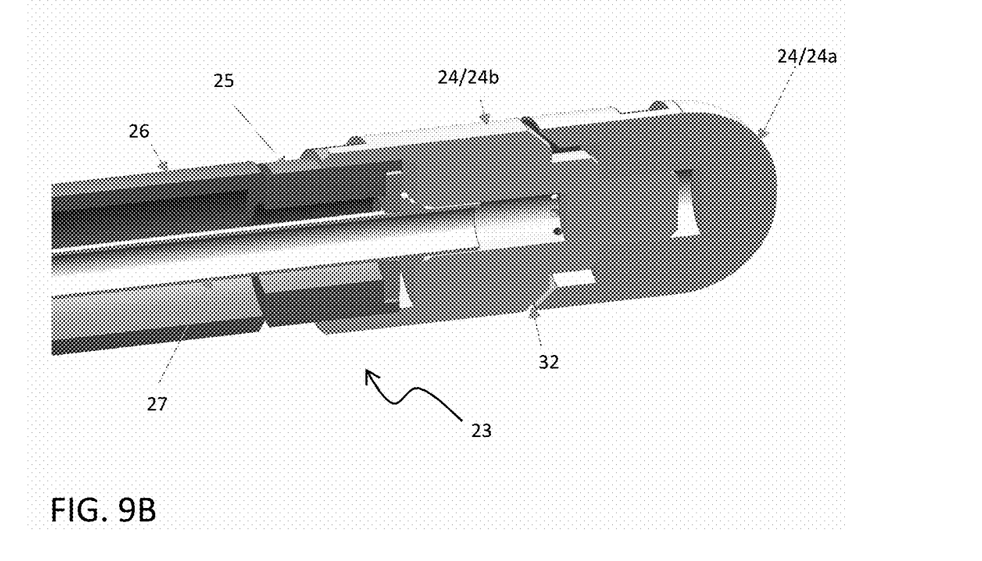

In FIGS. 9A-9B, a second embodiment of a lance head 24 is shown in a perspective view in which FIG. 9A shows an external view and FIG. 9B shows a cut-away view. The lance head 24 of the second embodiment differs from the first embodiment in that it is made in two discrete parts, i.e. a front part 24a and a rear part 24b, and comprises a circumferential nozzle slot 32. The rear part 24b in turn comprises a central blind hole into which the oxygen conduit 27 opens. From the front end of the central blind hole of the lance head 24, circumferentially distributed holes (radial bores, which are shown in FIG. 9B but not numbered) extend radially outward in fluid communication with the single nozzle slot 32. The front part 24a is attached to the front end of the rear part 24b to form a circumferential annular space (clearance, gap) into which the radial bores (holes) open. An annular gap extends outwardly and rearwardly (in the direction of the pivot arm) at an angle of 45° to the longitudinal axis L2 and connects the annular space and the lateral outer wall of the lance head to form a nozzle 32 for ejecting oxygen supplied under pressure through conduit 27.

Figure 10A:
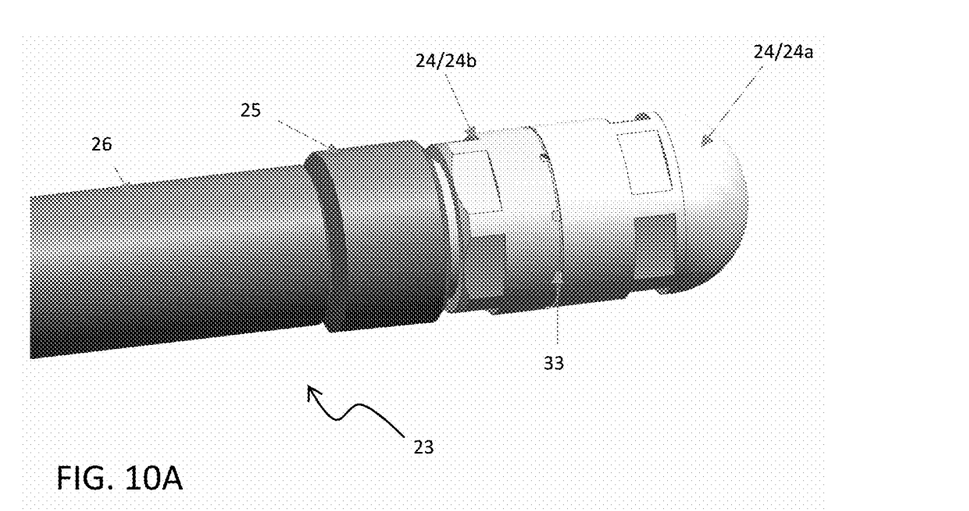
FIG. 10A shows an external view and FIG. 10B shows a cut-away view.
Figure 10B:
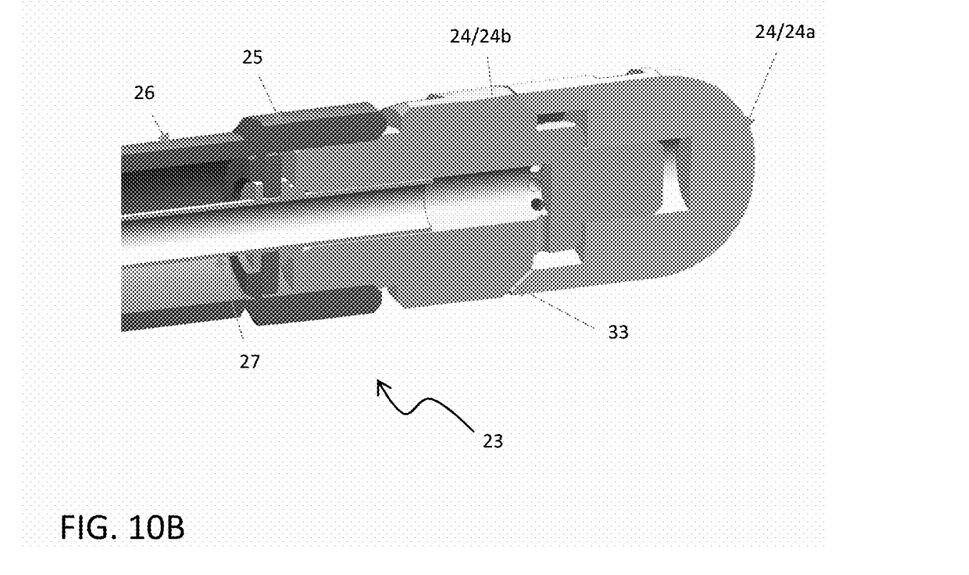

In FIGS. 10A-10B, a third embodiment of a lance head 24 is shown in a perspective view, in which FIG. 10A shows an external view and FIG. 10B shows a cut-away view. The lance head 24 of the third embodiment differs from the second embodiment in that, instead of the circumferential nozzle slot 32, it comprises a plurality of circumferentially distributed nozzle channels 33 formed by grooves between the rear part 24b and the front part 24a. The nozzle channels 33 again extend outwardly and rearwardly (toward the pivot arm) at an angle of 45° to the longitudinal axis L2, and connect the annular space and the lateral outer wall of the lance head to form nozzles 33 for ejecting oxygen supplied under pressure through the conduit 27.

The angle of the nozzle channels 31, 33 and of the nozzle slot 32 can be in the range of 30° to 60, preferably 40° to 50°, currently preferred 45°. The number of bores and nozzle channels can be 6 to 15, preferably 8 to 12, e.g. 9. The cross-section of the holes and nozzle channels is preferably in the range of 15 to 30 mm$^2$, e.g. 20 or 21 or 22 or 23 or 24 or 25 mm$^2$. So, for example, a round cross-section of 5 mm diameter (about 20 mm$^2$) or a rectangular cross-section of 4 mm×6 mm (24 mm$^2$). The height of the annular gap is preferably in the range of 0.1 mm to 3 mm, e.g. 0.5 mm or 1 mm.

In the embodiments described above and shown in the figures, the pivot arm 21 is formed straight and perpendicular to the lance 23. Of course, the pivot arm could also be bent and/or formed at an angle to the lance 23 and the lance 23 could be attached accordingly to (at) the end section of the pivot arm so that the alignment of the longitudinal axes L1 and L2 can be achieved.

It is explicitly emphasized that all features disclosed in the description and/or claims are to be considered separate and independent from each other for the purpose of the original disclosure as well as for the purpose of limiting the claimed invention regardless of the combinations of features in the embodiments and/or claims. It is explicitly stated that all range indications or indications of groups of units disclose any possible intermediate value or subgroup of units for the purpose of the original disclosure as well as for the purpose of limiting the claimed invention, in particular also as a limit of a range indication.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved tap hole maintenance devices, electric arc furnaces and methods of cleaning the tap hole of the same.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

Although some aspects of the present disclosure have been described in the context of a device, it is to be understood that these aspects also represent a description of a corresponding method, so that each block or component of a device, such as the control system, is also understood as a corresponding method step or as a feature of a method step. In an analogous manner, aspects which have been described in the context of or as a method step also represent a description of a corresponding block or detail or feature of a corresponding device, such as the control system.

Depending on certain implementation requirements, exemplary embodiments of the control system of the present disclosure may be implemented in hardware and/or in software. The implementation can be configured using a digital storage medium, for example one or more of a ROM, a PROM, an EPROM, an EEPROM or a flash memory, on which electronically readable control signals (program code) are stored, which interact or can interact with a programmable hardware component such that the respective method is performed.

A programmable hardware component can be formed by a processor, a computer processor (CPU=central processing unit), an application-specific integrated circuit (ASIC), an integrated circuit (IC), a computer, a system-on-a-chip (SOC), a programmable logic element, or a field programmable gate array (FGPA) including a microprocessor.

The digital storage medium can therefore be machine- or computer readable. Some exemplary embodiments thus comprise a data carrier or non-transient computer readable medium which includes electronically readable control signals which are capable of interacting with a programmable computer system or a programmable hardware component such that one of the methods described herein is performed. An exemplary embodiment is thus a data carrier (or a digital storage medium or a non-transient computer-readable medium) on which the program for performing one of the methods described herein is recorded.

In general, exemplary embodiments of the present disclosure, in particular the control system, are implemented as a program, firmware, computer program, or computer program product including a program, or as data, wherein the program code or the data is operative to perform one of the methods if the program runs on a processor or a programmable hardware component. The program code or the data can for example also be stored on a machine-readable carrier or data carrier. The program code or the data can be, among other things, source code, machine code, bytecode or another intermediate code.

A program according to an exemplary embodiment can implement one of the methods during its performing, for example, such that the program reads storage locations or writes one or more data elements into these storage locations, wherein switching operations or other operations are induced in transistor structures, in amplifier structures, or in other electrical, optical, magnetic components, or components based on another functional principle. Correspondingly, data, values, sensor values, or other program information can be captured, determined, or measured by reading a storage location. By reading one or more storage locations, a program can therefore capture, determine or measure sizes, values, variable, and other information, as well as cause, induce, or perform an action by writing in one or more storage locations, as well as control other apparatuses, machines, and components, and thus for example also perform complex processes using the control system, hydraulic cylinders, etc.

Therefore, although some aspects of the control system have been identified as "parts" or "units" or "steps", it is understood that such parts or units or steps need not be physically separate or distinct electrical components, but rather may be different blocks of program code that are executed by the same hardware component, e.g., one or more microprocessors.

We claim:

1. A tap hole maintenance device for cleaning an electric arc furnace comprising a furnace vessel that includes a furnace lower vessel having an eccentric or offset bottom tap hole extending along a first longitudinal axis (L1) and having a minimum diameter, and a furnace tilting device comprising a cradle, on which the furnace vessel is supported, configured to tilt the furnace vessel relative to a horizontal direction of a foundation that supports the electric arc furnace, the tap hole maintenance device comprising:
a pivot arm configured to be pivoted between a parking position and a maintenance position, and
a lance attached at an end portion of the pivot arm and extending along a second longitudinal axis (L2),
wherein:
the lance comprises a lance head that is movable along the second longitudinal axis (L2) between a lower end position and an upper end position,
the lance head has an outer diameter which is smaller than the minimum diameter of the bottom tap hole,
the lance head comprises one or more lateral oxygen outlet nozzles extending at an outlet angle that is oblique downwards with respect to the second longitudinal axis (L2), and
the lance is configured to be attached to the furnace vessel and/or to the cradle such that the lance is movable together with the furnace vessel in response to tilting the furnace vessel and the lance is located under the bottom tap hole with the second longitudinal axis (L2) of the lance being coaxial with the first longitudinal axis (L1) of the tap hole in the maintenance position of the pivot arm (21), so that the lance head is movable into and through the tap hole in response to movement of the lance head from the lower end position to the upper end position.

2. The tap hole maintenance device according to claim 1, wherein the outlet angle has a vertex formed by the second longitudinal axis and at least one of the one or more lateral oxygen outlet nozzles, the vertex being the highest point of the outlet angle along the second longitudinal axis.

3. The tap hole maintenance device according to claim 2, wherein the outer diameter of the entire lance head is smaller than the minimum diameter of the bottom tap hole such that at the upper end position, the lance head is located above an upper opening of the bottom tap hole.

4. The tap hole maintenance device according to claim 3, wherein the outlet angle is in the range of 30° to 60° to the second longitudinal axis (L2).

5. The tap hole maintenance device according to claim 3, further comprising:
a column that is rotatably supported about an axis of rotation (D) and is movable up and down along the axis of rotation (D), the column being configured to be attached to the furnace vessel and/or to the cradle of the electric arc furnace such that the axis of rotation (D) is parallel to the second longitudinal axis (L2).

6. The tap hole maintenance device according to claim 5, wherein:
the pivot arm is an extension arm of the column, and
rotary movement of the column causes the pivot arm to pivot about the axis of rotation (D).

7. The tap hole maintenance device according to claim 3, wherein the lance is attached at the end portion of the pivot arm such that the lance is movable in a radial direction that is perpendicular to the axis of rotation (D).

8. The tap hole maintenance device according to claim 3, further comprising:
one or more detectors configured to detect movement paths of pivotal movement of the pivot arm and of linear movement of the lance head.

9. The tap hole maintenance device according to claim 3, wherein the lance comprises a lance shaft having an oxygen supply line.

10. The tap hole maintenance device according to claim 3, wherein the lance head is mandrel-shaped and is detachably connected to a shaft of the lance.

11. The tap hole maintenance device according to claim 10, wherein the lance head is threadably connected to the shaft of the lance.

12. The tap hole maintenance device according to claim 3, wherein the pivot arm is water-cooled.

13. The tap hole maintenance device according to claim 3, wherein at least the lance head is configured to be moved in an automated manner between the upper end position and the lower end position.

14. A tap hole maintenance device for cleaning an electric arc furnace comprising a furnace vessel that includes a furnace lower vessel having an eccentric or offset bottom tap hole extending along a first longitudinal axis (L1) and having a minimum diameter, and a furnace tilting device comprising a cradle, on which the furnace vessel is supported, configured to tilt the furnace vessel relative to a horizontal direction of a foundation that supports the electric arc furnace, the tap hole maintenance device comprising:
 a pivot arm configured to be pivoted between a parking position and a maintenance position,
 a lance attached at an end portion of the pivot arm and extending along a second longitudinal axis (L2), and
 a force detector configured to detect a force exerted by the lance head during movement from the lower end position to the upper end position,
 wherein:
 the lance comprises a lance head that is movable along the second longitudinal axis (L2) between a lower end position and an upper end position,
 the lance head has an outer diameter which is smaller than the minimum diameter of the bottom tap hole,
 the lance head comprises one or more lateral oxygen outlet nozzles extending at an outlet angle that is oblique downwards with respect to the second longitudinal axis (L2),
 the lance is configured to be attached to the furnace vessel and/or to the cradle such that the lance is movable together with the furnace vessel in response to tilting the furnace vessel and the lance is located under the bottom tap hole with the second longitudinal axis (L2) of the lance being coaxial with the first longitudinal axis (L1) of the tap hole in the maintenance position of the pivot arm, so that the lance head is movable into and through the tap hole in response to movement of the lance head from the lower end position to the upper end position,
 at least the lance head is configured to be moved in an automated manner between the upper end position and the lower end position, and
 the tap hole maintenance device is configured to stop automated movement of the lance head from the lower end position to the upper end position in response to detection of a force exerted by the lance head that meets or exceeds an upper limit value.

15. The tap hole maintenance device according to claim 14, further comprising:
 a column that is rotatably supported about an axis of rotation (D) and is movable up and down along the axis of rotation (D),
 wherein:
 the column is configured to be attached to the furnace vessel and/or to the cradle of the electric arc furnace such that the axis of rotation (D) is parallel to the second longitudinal axis (L2),
 the pivot arm is an extension arm of the column,
 rotary movement of the column causes the pivot arm to pivot about the axis of rotation (D), and
 the lance is attached at the end portion of the pivot arm such that the lance is movable in a radial direction that is perpendicular to the axis of rotation (D).

16. The tap hole maintenance device according to claim 15, further comprising:
 one or more detectors configured to detect movement paths of pivotal movement of the pivot arm and of linear movement of the lance head.

17. The tap hole maintenance device according to claim 16, wherein:
 the lance comprises a lance shaft having an oxygen supply line,
 the lance head is mandrel-shaped and is threadably connected to a shaft of the lance,
 at least the lance head is configured to be moved in an automated manner from the lower end position to the upper end position,
 a force detector is configured to detect a force exerted by the lance head during movement from the lower end position to the upper end position, and
 the tap hole maintenance device is configured to stop automated movement of the lance head between the lower end position and the upper end position in response to detection of a force exerted by the lance head that meets or exceeds an upper limit value.

18. An electric arc furnace comprising:
 a furnace vessel comprising a furnace lower vessel having an eccentric or offset bottom tap hole extending along a first longitudinal axis (L1) and having a minimum diameter,
 a furnace tilting device comprising a cradle, on which the furnace vessel is supported, the cradle being configured to tilt the furnace vessel relative to a horizontal direction of a foundation that supports the electric arc furnace, and
 the tap hole maintenance device according to claim 1,
 wherein:
 the tap hole maintenance device is attached to the furnace vessel and/or to the cradle to be movable together with the furnace vessel in response to tiling of the furnace vessel by the cradle, and
 the lance is configured to be located below the bottom tap hole in the maintenance position of the pivot arm with the second longitudinal axis (L2) of the lance being coaxial with the first longitudinal axis (L1) of the bottom tap hole such that the lance head is movable into and entirely through the tap hole during movement of the lance head from the lower end position of the lance head to the upper end position of the lance head.

19. The electric arc furnace of claim 18, further comprising:
 a gantry configured to lift and lower a furnace lid and an electrode assembly that is arranged laterally adjacent to the furnace vessel with respect to the tilting movement, and
 wherein the parking position of the pivot arm is located laterally next to the bottom tap hole on the same side of the furnace vessel as the gantry.

20. A method for cleaning the electric arc furnace according to claim 18, comprising:
 while the second longitudinal axis (L2) of the lance is coaxial with the first longitudinal axis (L1) of the bottom tap hole, moving the lance head into and entirely through the tap hole from the lower end position of the lance head to the upper end position of the lance head where the lance head is located above an upper opening of the bottom tap hole, and
 subsequently, moving the lance head back through the bottom tap hole from the upper end position to the lower end position while expelling oxygen through the one or more lateral oxygen outlet nozzles.

21. The method according to claim 20, further comprising:
 using a force detector to detect a force exerted by the lance head during the movement of the lance head from the lower end position of the lance head to the upper end position of the lance head, and automatically stopping the movement of the lance head in response to detection of a force that meets or exceeds an upper limit value for the detected force.

22. The method according to claim 20, wherein at the upper end position the lance head is at least 300 millimeters upward from the upper opening of the bottom tap hole.

* * * * *